United States Patent
Wu et al.

(10) Patent No.: US 9,140,619 B2
(45) Date of Patent: Sep. 22, 2015

(54) PIEZOELECTRIC VACUUM GAUGE AND MEASURING METHOD THEREOF

(75) Inventors: Chia-Che Wu, Taichung (TW); Chi-Shao Chen, Taichung (TW); Che-Yu Lin, Taichung (TW); Fong-Zhi Chen, Hsinchu (TW); Fan-Chun Hsieh, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 332 days.

(21) Appl. No.: 13/562,709

(22) Filed: Jul. 31, 2012

(65) Prior Publication Data
US 2013/0291644 A1 Nov. 7, 2013

(30) Foreign Application Priority Data

May 2, 2012 (TW) .............................. 101115502 A

(51) Int. Cl.
*G01L 9/00* (2006.01)
(52) U.S. Cl.
CPC .................................... *G01L 9/0022* (2013.01)
(58) Field of Classification Search
CPC ....... G01L 9/0022; G01L 9/08; G01L 9/0019; G01L 9/0013; G01L 9/0016; G01L 9/0008
USPC ............ 73/756, 727, 721, 715, 704; 600/462, 600/488
See application file for complete search history.

(56) References Cited

U.S. PATENT DOCUMENTS

| | | | |
|---|---|---|---|
| 5,591,900 A * | 1/1997 | Bronowocki et al. ............. 73/52 |
| 6,938,489 B2 * | 9/2005 | Esashi et al. .................... 73/704 |
| 6,973,835 B2 * | 12/2005 | Rangsten et al. ............... 73/754 |
| 7,246,524 B1 * | 7/2007 | Kholwadwala et al. ........ 73/715 |
| 2001/0037066 A1 * | 11/2001 | Smith ........................... 600/462 |
| 2005/0080346 A1 * | 4/2005 | Gianchandani et al. ...... 600/486 |
| 2005/0134153 A1 * | 6/2005 | Bachellerie et al. .......... 310/366 |
| 2006/0279553 A1 * | 12/2006 | Soss et al. ..................... 345/173 |
| 2008/0198187 A1 * | 8/2008 | Aoki et al. ...................... 73/291 |
| 2010/0129920 A1 * | 5/2010 | Mortet et al. ................... 73/702 |
| 2010/0180354 A1 * | 7/2010 | Degertekin ....................... 850/1 |
| 2011/0050040 A1 * | 3/2011 | Yamamoto et al. ............ 310/338 |
| 2011/0055985 A1 * | 3/2011 | Kubsky et al. ................... 850/33 |
| 2012/0060617 A1 * | 3/2012 | Kinnell ............................ 73/704 |
| 2012/0104898 A1 * | 5/2012 | Qu et al. ......................... 310/319 |
| 2012/0161921 A1 * | 6/2012 | Browne et al. ..................... 338/2 |
| 2012/0198916 A1 * | 8/2012 | Kinnell et al. ............... 73/24.06 |
| 2012/0266686 A1 * | 10/2012 | Huffman ......................... 73/826 |

* cited by examiner

*Primary Examiner* — Lisa Caputo
*Assistant Examiner* — Philip Cotey
(74) *Attorney, Agent, or Firm* — Chun-Ming Shih

(57) ABSTRACT

A piezoelectric vacuum gauge includes an actuator with a flexible portion, an actuating unit, a sensor unit, a signal input terminal and a signal output terminal, and a fixture unit having a base portion and a cover portion. An external signal is generated by a signal generator. Receive and transmit an external signal to an actuating unit by the signal input terminal so that the actuating unit has a vibration. Prompt a flexible portion by the actuating unit to produce a first resonant motion when the actuating unit having the vibration. The first resonant motion converts into a second resonant motion because the flexible portion is subject to a damping force of ambient air. Prompt a sensor unit by the second resonant motion to cause a shape transformation of the sensor unit to generate a detecting signal. Output the detecting signal to an external instrument by a signal output terminal of sensor unit to calculate a vacuum pressure value.

16 Claims, 4 Drawing Sheets

PIEZOELECTRIC VACUUM GAUGE AND MEASURING METHOD THEREOF

BACKGROUND OF THE INVENTION

1. Field of the Invention

The invention generally relates to a vacuum gauge. More particularly, the invention relates to a vacuum gauge that utilizes a piezoelectric material to convert a mechanical force to electrical charges according to the direct piezoelectric effect.

2. Description of the Prior Art

The conventional spinning rotor viscosity gauge comprises a sensor, two vertical stability control circular coils, a steel pipe and a steel ball. The steel ball is placed inside the steel pipe and one end of the steel pipe is sealed. The steel pipe can not be magnetized. In use, the steel ball is suspended between two permanent magnets of the sensor. The two vertical stability control circular coils are provided between the two permanent magnets to stabilize the steel ball in the vertical direction. In addition, two additional acceleration circular coils are provided to accelerate the steel ball. When the steel ball is accelerated to 400 RPS, these acceleration circular coils are turned off. The ball will slow down gradually due to the viscosity of the remaining air. The change in the rotational speed of the ball is then used to calculate the numerical value of the vacuum or air pressure. However, such spinning rotor viscosity gauge is too bulky and structurally complicated. There is a need for a vacuum gauge that is smaller, highly sensitive, highly accurate and of lower production cost and has a wider range of measurements.

In 1961, the Becker's research team developed a thin plate type vacuum gauge. A thin plate is placed in a magnetic field generated by a permanent magnet. Then, a motion signal is fed to the thin plate to make it vibrate. Because such vibration would cause a change in the magnetic field, an induced current is generated in the thin plate. In addition, the damping force of the ambient air or gas would reduce the amplitude of such vibration and hence the induced current would be reduced too. The change in the induced current is used to measure the numerical value of the air pressure. However, such thin plate type vacuum gauge is also structurally complicated and more expensive.

In 2007, K. Yohei et al developed a quarts friction gauge. Such quarts friction gauge is structurally simpler than other types of viscosity gauge because it uses the difference in impedance to measure the air pressure (the pressure varies with impedance exponentially). However, because quarts has a low efficiency in the conversion of mechanical force to electricity, such gauge can not be used to measure lower pressures near true vacuum.

In the viscosity vacuum gauge, the viscosity of the remaining air or gas is utilized to measure the pressure. Damping forces may be calculated by the following formula. With regard to the free damping of a flexible object, the decay rate of the vibration amplitude of the flexible object has a high correlation with the damping force of environment.

As the damping force increases, the amplitude would decrease. When an external simple harmonic force exerts on a system, the following may be used to calculate the amplification rate of the system:

$$\frac{X}{\delta_{st}} = \frac{1}{\sqrt{(1-r^2)^2 + (2\zeta r)^2}}$$

where X is the amplitude; $\delta_{st}$ is the static replacement; r is the ratio of the driving frequency and the natural frequency; $\zeta$ is the ratio of the damping forces.

If $\zeta<0.05$ and r=1 the driving frequency is equal to the natural frequency), the amplification rate of the system will be:

$$\frac{X}{\delta_{st}} = \frac{1}{2\zeta} = Q$$

Where Q is defined as "quality factor", and there would be two frequencies, R1 and R2 correspond to the amplitude $$\frac{Q}{\sqrt{2}},$$

R1 and R2 are called "half efficiency points" and the difference between these two points is called bandwidth. Therefore, we can obtain:

$$\zeta \approx \frac{R_2 - R_1}{2\omega_n}$$

where $\omega_n$ is the natural frequency of the system.

SUMMARY OF THE INVENTION

The object of the present invention is to provide a piezoelectric vacuum gauge that employs the characteristics of piezoelectric material, can simplify the complicated structure of the vacuum gauge in the prior art and can detect smaller numerical values of the pressures of vacuum.

To reach the object, the piezoelectric vacuum gauge of the present invention is disclosed. The piezoelectric vacuum gauge of the present invention comprises a piezoelectric vacuum gauge, comprising: an actuator, including a flexible portion, made of a long flexible material; an actuating unit, connected to one end of the flexible portion, the actuating unit further including a signal input terminal to receive an external signal; and a sensor unit, connected to the other end of the flexible portion, the sensor unit further including a signal output terminal to output a detecting signal; wherein, the actuating unit has a vibration to prompt the flexible portion to produce a first resonant motion when the signal input terminal receives the external signal, and the first resonant motion converts into a second resonant motion because the flexible portion is subject to a damping force of ambient air, and the second resonant motion prompts the sensor unit to cause a shape transformation of the sensor unit to generate the detecting signals, and the signal output terminal outputs the detecting signal to an external instrument to calculate a vacuum pressure value.

In the invention, further including a signal generator, the signal generator generates the external signal and sends the external signal to the signal input terminal.

In the preferred embodiment, the actuating unit and the sensor unit are made of a piezoelectric material.

In the preferred embodiment, the piezoelectric material is PZT (lead zirconate titanate), AlN (aluminum nitride) or ZnO (zinc oxide).

In the preferred embodiment, further comprising a fixture unit, the fixture unit fixes the actuator so as to keep the actuator vibrates stably.

In the preferred embodiment, the fixture unit further comprises a base portion and two cover portions.

In the preferred embodiment, the base portion comprises a first fixing portion, a second fixing portion and a central recess, and wherein the central recess is located between the first fixing portion and the second fixing portion, and wherein a part of the actuating unit is placed on an upside of the first recess and a part of the sensor unit is placed on an upside of the second recess, and wherein two cover portions fitted to the first fixing portion and the second fixing portion respectively after the actuating unit is fitted to the first recess and the sensor unit is fitted to the second recess so as to fix the actuator.

In the preferred embodiment, the base portion and two cover portions are made of an electrically insulating material.

An vacuum measuring method by using the piezoelectric vacuum gauge, comprises the following steps: (1) receiving and transmitting an external signal to an actuating unit by the signal input terminal so that the actuating unit has a vibration; (2) prompting a flexible portion by the actuating unit to produce a first resonant motion when the actuating unit has the vibration; (3) converting the first resonant motion into a second resonant motion because the flexible portion is subject to a damping force of ambient air; (4) prompting a sensor unit by the second resonant motion to cause a shape transformation of the sensor unit to generate a detecting signal; (5) outputting the detecting signal to an external instrument by a signal output terminal of sensor unit to calculate a vacuum pressure value.

In the preferred embodiment, the method further comprises generating the external signal by a signal generator and sending the external signal to the signal input terminal of the actuating unit.

In the preferred embodiment, the actuating unit and the sensor unit are made of a piezoelectric material.

In the preferred embodiment, the piezoelectric material is PZT (lead zirconate titanate), AlN (aluminum nitride) or ZnO (zinc oxide).

In the preferred embodiment, the method further comprises a fixture unit, and the fixture unit fixes the actuator so as to keep the actuator vibrates stably.

In the preferred embodiment, the fixture unit further comprises a base portion and two cover portions.

In the preferred embodiment, the base portion comprises a first fixing portion, a second fixing portion and a central recess, and wherein the central recess is located between the first fixing portion and the second fixing portion, and wherein a part of the actuating unit is placed on an upside of the first recess and a part of the sensor unit is placed on an upside of the a second recess, and wherein the two cover portions fitted to the first fixing portion and the second fixing portion respectively after the actuating unit is fitted to the first recess and the sensor unit is fitted to the second recess so as to fix the actuator.

In the preferred embodiment, the base portion and two cover portions are made of an electrically insulating material.

As of now, with the advancement of technology and science, there is a need for vacuum gauges that can be used to measure the vacuum pressure during process in lab or in the development of products. In the prior art, the vacuum gauge has a complicated structure. The piezoelectric vacuum gauge of the present invention has the following advantages:

(1) Structurally simple: The piezoelectric vacuum gauge of the present invention is structurally simple—with an actuating unit (made of a piezoelectric material), a sensor unit (made of a piezoelectric material) and a flexible portion. As the vibration amplitude of the flexible portion is changed due to the damping force of the remaining/ambient air, the sensor unit can immediately detect such change and convert it into an output signal.

(2) High accuracy: The sensor unit, which is made of an easily available piezoelectric material, is able to detect minute changes in the remaining/ambient air. In the production of the piezoelectric vacuum gauge of the present invention, a piezoelectric material is plated onto the surface of the flexible portion; therefore, production is greatly simplified.

DETAILED DESCRIPTION OF THE PREFERRED EMBODIMENT

The features and advantages of the present invention will be fully understood and appreciated from the following detailed description of the accompanying drawings. Although a preferred embodiment of the present invention will be described in detail hereinabove, it should be understood that the preferred embodiment is to be regarded in an illustrative manner rather than a restrictive manner.

Figure 1:
FIG. 1 is a side view schematically illustrating the actuator of the piezoelectric vacuum gauge of the present invention.

Please see FIG. 1, which illustrates the actuator of the piezoelectric vacuum gauge of the present invention. The actuator 1 comprises a flexible portion 11, an actuating unit 12, a sensor unit 14, a signal input terminal 13 and a signal output terminal 15. The flexible portion 11 is made of a metal or a plastic material and may return to its original condition after an external force exerts on it. Both the actuating unit 12 and the sensor unit 14 are made of a piezoelectric material, which may be PZT (lead zirconate titanate), AlN (aluminum nitride) or ZnO (zinc oxide). The actuating unit 12 and the sensor unit 14 may be plated or connected at the two ends/sides of the flexible portion 11 and the flexible portion 11 is free to vibrate between the actuating unit 12 and the sensor unit 14. A periodical motion signal (generated by a sine wave generator or a square wave generator) may be input through the signal input terminal 13 to reach the actuating unit 12, which would in turn start to vibrate. Such periodical motion signal may cause the sensor unit 14 to deform and convert such applied mechanical force into an electric signal, which may be output through the signal output terminal 15 to an external instrument, which may analyze and calculate such output signal.

Figure 2:
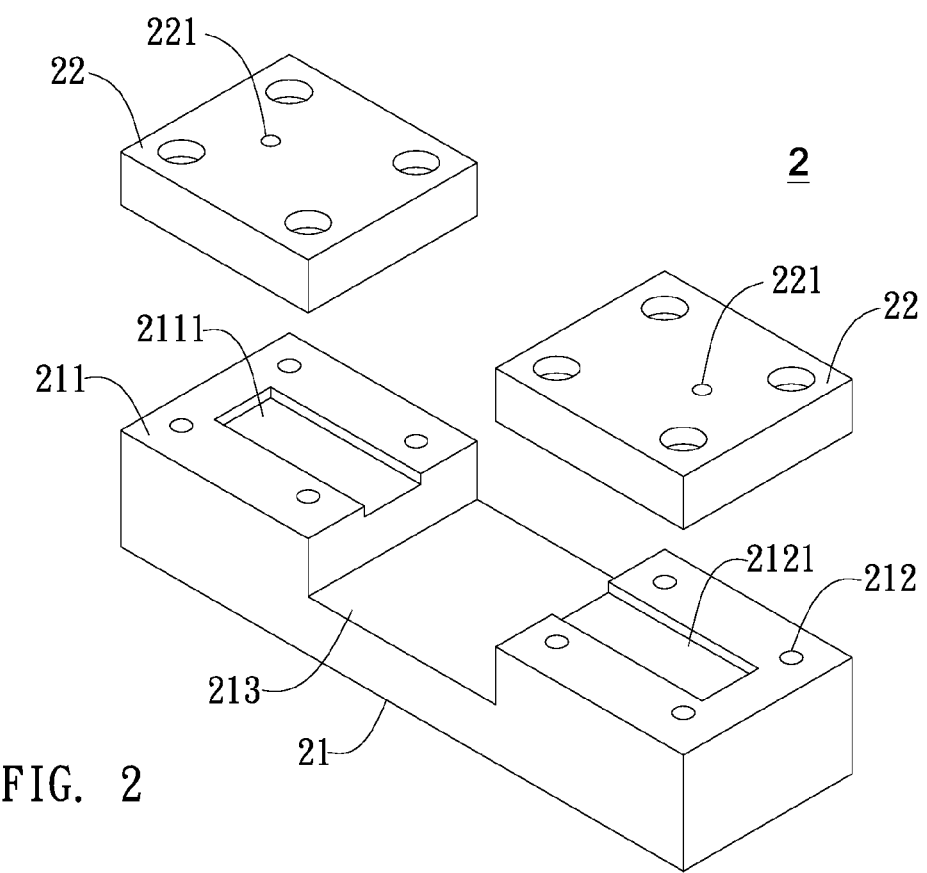
FIG. 2 is a perspective view schematically illustrating the fixture unit of the piezoelectric vacuum gauge of the present invention.

Please see FIG. 2, which illustrates the fixture unit of the piezoelectric vacuum gauge of the present invention. The fixture unit 2 comprises a base portion 21 and two cover portions 22. The base portion 21 comprises a first fixing portion 211, a second fixing portion 212 and a central recess 213. The central recess 213 is located between the first fixing portion 211 and the second fixing portion 212. The longitudinal length of the central recess 213 or the distance between the first fixing portion 211 and the second fixing portion 212 allows the flexible portion 11 to vibrate freely. The first fixing portion 211 has a first recess 2111 on its upper part. The first recess 2111 may hold the actuating unit 12. The second fixing portion 212 has a second recess 2121 on its upper part. The second recess 2121 may hold the sensor unit 14. The two cover portions 22 may be fitted to the first fixing portion 211 and the second fixing portion 212 after the actuating unit 12 is fitted to the first recess 2111 and the sensor unit 14 is fitted to the second recess 2121 so as to fix the actuator 1. A hole 221 is provided in each cover portion 22 and is in communication with the first recess 2111 or the second recess 2121.

Figure 3:
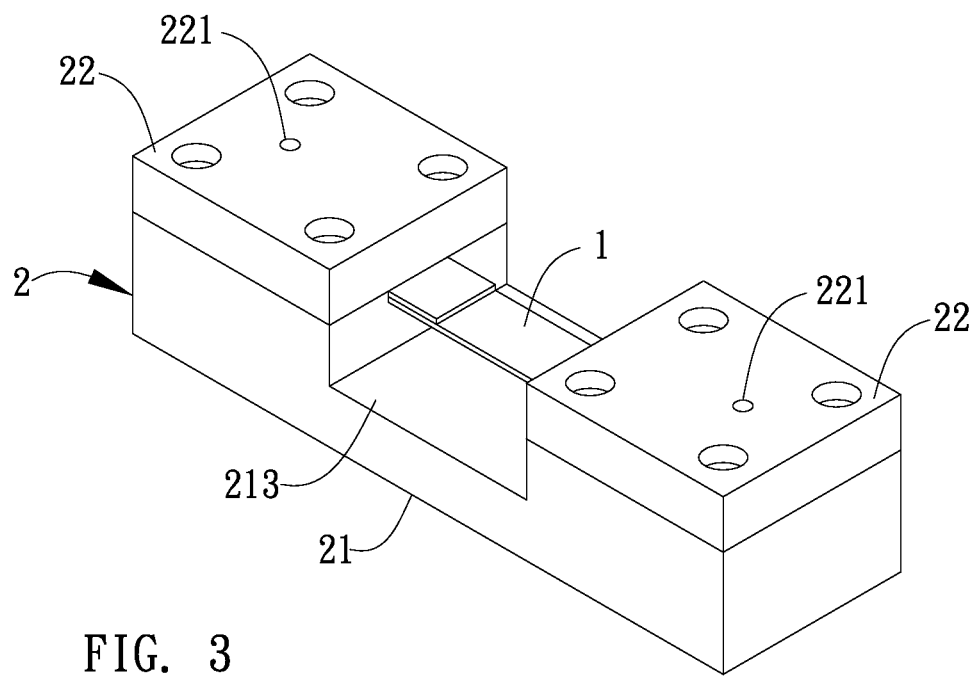
FIG. 3 is a perspective view of the piezoelectric vacuum gauge of the present invention.
Figure 4:
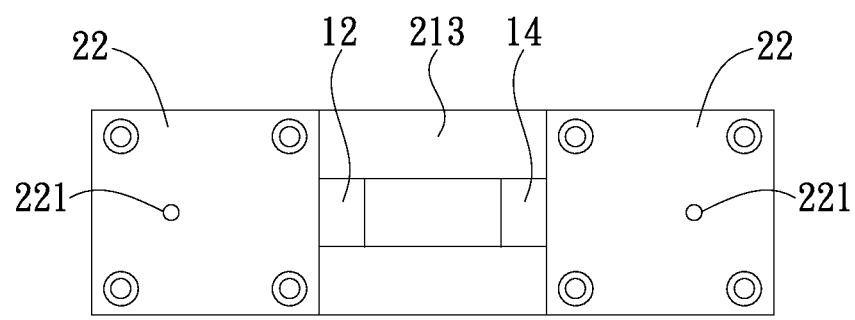
FIG. 4 is a top view of the piezoelectric vacuum gauge of the present invention.

Now, please refer to FIGS. 3 and 4. FIG. 3 is a perspective view of the piezoelectric vacuum gauge of the present invention. FIG. 4 is a top view of the piezoelectric vacuum gauge of the present invention. As shown in the drawings, the actuator 1 is fixed by the fixture unit 2, a part of the actuating unit 12 is held in the first recess 2111 (as shown in FIG. 2) and a part of the sensor unit 14 is held in the second recess 2121 (as shown in FIG. 2) so that the actuating unit 12 may vibrate after a motion signal is fed to the actuating unit 12. The two holes 221 may facilitate the electrical connection between the signal input terminal 13 and the external instrument as well as between the signal output terminal 15 and the external instrument.

Figure 5:
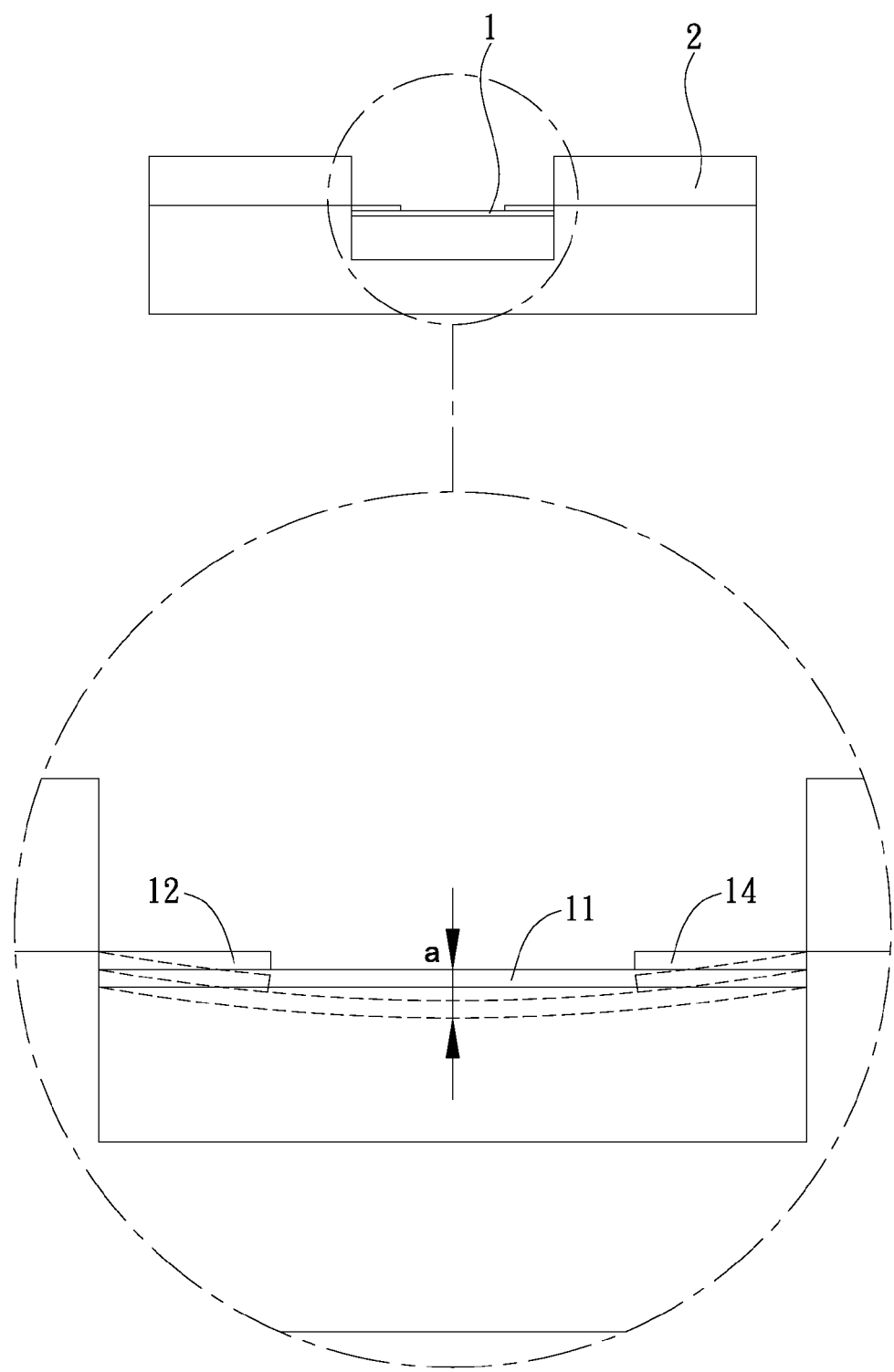
FIG. 5 is two views illustrating how the piezoelectric vacuum gauge of the present invention works.

Now, please see FIG. 5, which illustrates how the piezoelectric vacuum gauge of the present invention works. First, a periodical motion signal is generated by an external motion signal generator and is then fed to the actuating unit 12 through the signal input terminal 13. Then, the actuating unit 12 prompts the flexible portion 11 to start to vibrate. Because both the actuating unit 12 and the sensor unit 14 are fixed, as the actuating unit 12 prompts the flexible portion 11 to start to vibrate, the flexible portion 11 would vibrate with an amplitude of "a" according to the periodical motion signal. Now, because the damping force of the remaining air (air viscosity) would alter the vibration amplitude/pattern of the flexible portion 11, the flexible portion 11 would vibrate differently from the actuating unit 12 and the amplitude of the flexible portion 11 would change into "b" (not indicated in the drawings). Next, the numerical value of this amplitude will be output through the signal output terminal 15 to the external instrument to calculate the vacuum value corresponding to this value.

Figure 6:
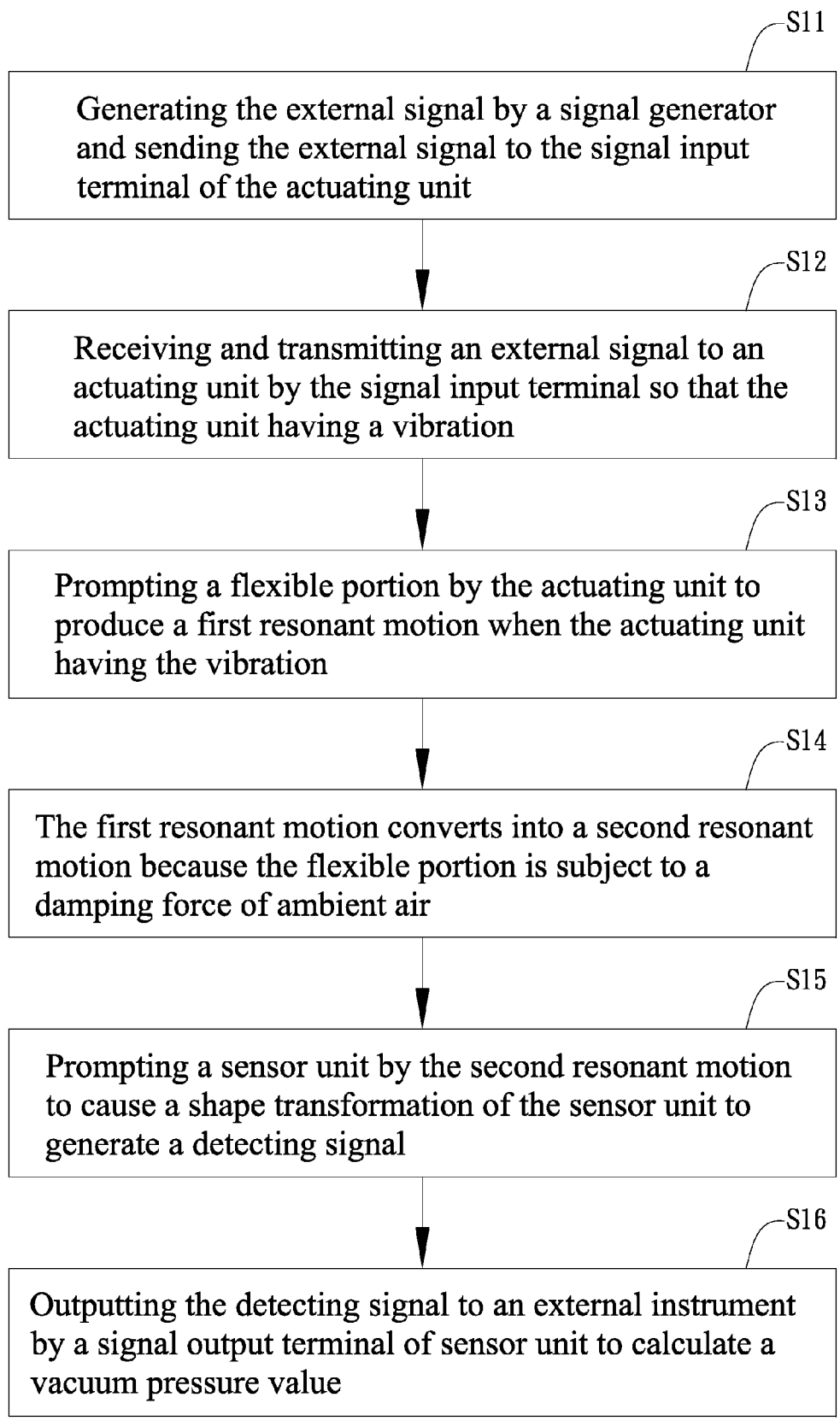
FIG. 6 is a flowchart illustrating how the piezoelectric vacuum gauge of the present invention is used.

From the above, we can see that the piezoelectric vacuum gauge may provide a simple and swift way to measure the pressures of vacuum. Please see FIG. 6, which is a flowchart illustrating how the piezoelectric vacuum gauge of the present invention is used.

First, in step S11: generating the external signal by a signal generator and sending the external signal to the signal input terminal of the actuating unit.

Then, in step S12: receiving and transmitting an external signal to an actuating unit by the signal input terminal so that the actuating unit having a vibration.

Next, in step S13: prompting a flexible portion by the actuating unit to produce a first resonant motion when the actuating unit having the vibration.

In step S14: converting the first resonant motion into a second resonant motion because the flexible portion is subject to a damping force of ambient air.

In step S15: prompting a sensor unit by the second resonant motion to cause a shape transformation of the sensor unit to generate a detecting signal.

Finally, in step S16: outputting the detecting signal to an external instrument by a signal output terminal of sensor unit to calculate a vacuum pressure value.

Although a preferred embodiment of the present invention has been described in detail hereinabove, it should be understood that the preferred embodiment is to be regarded in an illustrative manner rather than a restrictive manner, and all variations and modifications of the basic inventive concepts herein taught still fall within the scope of the present invention.

What is claimed is:

1. A piezoelectric vacuum gauge, comprising:
a signal generator, providing an external signal; and
an actuator configured in a detecting vacuum space of the piezoelectric vacuum gauge, comprising:
a detecting portion with a predetermined length, made of a flexible material;
an actuating unit, directly connected to one end of the detecting portion, the actuating unit further including a signal input terminal to connect the signal generator and receive the external signal; and
a sensor unit, connected to the other end of the detecting portion, the sensor unit further including a signal output terminal to output a detecting signal;
wherein the detecting portion, part of the actuating unit, and part of the sensor unit are all directly exposed to the detecting vacuum space; and
wherein, the detecting portion is produced a first resonant motion when the signal input terminal receives the external signal, and the first resonant motion converts into a second resonant motion because the detecting portion is subject to a damping force of the detecting vacuum space as the detecting portion with the predetermined length, and a shape transformation of the sensor unit is produced to generate the detecting signals according to the second resonant motion, and the signal output terminal outputs the detecting signal to an external instrument to calculate a vacuum pressure value of the detecting vacuum space.

2. The piezoelectric vacuum gauge as recited in claim 1, wherein the signal generator generates the external signal and sends the external signal to the signal input terminal.

3. The piezoelectric vacuum gauge as in claim 1, wherein the actuating unit and the sensor unit are made of a piezoelectric material.

4. The piezoelectric vacuum gauge as recited in claim 3, wherein the piezoelectric material is PZT (lead zirconate titanate), AlN (aluminum nitride) or ZnO (zinc oxide).

5. The piezoelectric vacuum gauge as recited in claim 1, further comprising a fixture unit, wherein the fixture unit fixes the actuator so as to keep the actuator vibrating stably.

6. The piezoelectric vacuum gauge as recited in claim 1, wherein the fixture unit further comprises a base portion and two cover portions.

7. The piezoelectric vacuum gauge as recited in claim 6, wherein the base portion comprises a first fixing portion, a second fixing portion and a central recess, and wherein the central recess is located between the first fixing portion and the second fixing portion, and wherein a part of the actuating unit is placed on an upside of the first recess and a part of the sensor unit is placed on an upside of the second recess, and wherein the two cover portions fitted to the first fixing portion and the second fixing portion respectively after the actuating unit is fitted to the first recess and the sensor unit is fitted to the second recess so as to fix the actuator.

8. The piezoelectric vacuum gauge as recited in claim 1, wherein the base portion and two cover portions are made of an electrically insulating material.

9. A vacuum measuring method by using the piezoelectric vacuum gauge, comprising the following steps:
   (1) receiving and transmitting an external signal from a signal generator to an actuating unit by the signal input terminal so that the actuating unit having a vibration;
   (2) prompting a detecting portion by the actuating unit to produce a first resonant motion when the actuating unit having the vibrating by the external signal;
   (3) converting the first resonant motion into a second resonant motion because the detecting portion is subject to a damping force of a detecting vacuum space of the piezoelectric vacuum gauge;
   (4) prompting a sensor unit by the second resonant motion to cause a shape transformation of the sensor unit to generate a detecting signal; and
   (5) outputting the detecting signal to an external instrument by a signal output terminal of sensor unit to calculate a vacuum pressure value;
   Wherein part of the actuating unit, the detecting portion, and part of the sensor unit are configured in and directly exposed to the detecting vacuum space of the piezoelectric vacuum gauge.

10. The measuring method as recited in claim 9, further comprising:
generating the external signal by a signal generator and sending the external signal to the signal input terminal of the actuating unit.

11. The measuring method as recited in claim 9, wherein the actuating unit and the sensor unit are made of a piezoelectric material.

12. The measuring method as recited in claim 11, wherein the piezoelectric material is PZT (lead zirconate titanate), AlN (aluminum nitride) or ZnO (zinc oxide).

13. The measuring method as recited in claim 9, further comprising a fixture unit fixing the actuator so as to keep the actuator vibrating stably.

14. The measuring method as recited in claim 13, wherein the fixture unit further comprises a base portion and two cover portions.

15. The measuring method as recited in claim 14, wherein the base portion comprises a first fixing portion, a second fixing portion and a central recess, and wherein the central recess is located between the first fixing portion and the second fixing portion, and wherein a part of the actuating unit is placed on an upside of the first recess and a part of the sensor unit is placed on an upside of the a second recess, and wherein the two cover portions fitted to the first fixing portion and the second fixing portion respectively after the actuating unit is fitted to the first recess and the sensor unit is fitted to the second recess so as to fix the actuator.

16. The measuring method as recited in claim 13, wherein the base portion and two cover portions are made of an electrically insulating material.

* * * * *